United States Patent
Thavalengal

(10) Patent No.: US 11,288,504 B2
(45) Date of Patent: Mar. 29, 2022

(54) IRIS LIVENESS DETECTION FOR MOBILE DEVICES

(71) Applicant: FotoNation Limited, Galway (IE)

(72) Inventor: Shejin Thavalengal, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 17/073,247

(22) Filed: Oct. 16, 2020

(65) Prior Publication Data

US 2021/0034864 A1 Feb. 4, 2021

Related U.S. Application Data

(63) Continuation of application No. 16/240,120, filed on Jan. 4, 2019, now Pat. No. 10,810,423, which is a
(Continued)

(51) Int. Cl.
*G06K 9/00* (2006.01)
*H04N 5/04* (2006.01)
(Continued)

(52) U.S. Cl.
CPC ..... *G06K 9/00617* (2013.01); *G06K 9/00906* (2013.01); *G06K 9/6289* (2013.01);
(Continued)

(58) Field of Classification Search
CPC ........... G06K 9/00617; G06K 9/00906; G06K 9/6289; G06T 5/00; H04N 5/04; H04N 5/332; H04N 9/04515
See application file for complete search history.

(56) References Cited

U.S. PATENT DOCUMENTS 5,291,560 A 3/1994 Daugman
6,813,380 B1 * 11/2004 Sola ..................... G06K 9/3241
382/170
(Continued)

OTHER PUBLICATIONS

S. Barra, A. Casanova, F. Narducci, and S. Ricciardi. Ubiquitous iris recognition by means of mobile devices. Pattern Recognition Letters, (0):-, 2014.
(Continued)

*Primary Examiner* — James M Pontius
(74) *Attorney, Agent, or Firm* — Lee & Hayes, P.C.

(57) ABSTRACT

An approach for an iris liveness detection is provided. A plurality of image pairs is acquired using one or more image sensors of a mobile device. A particular image pair is selected from the plurality of image pairs, and a hyperspectral image is generated for the particular image pair. Based on, at least in part, the hyperspectral image, a particular feature vector for the eye-iris region depicted in the particular image pair is generated, and one or more trained model feature vectors generated for facial features of a particular user of the device are retrieved. Based on, at least in part, the particular feature vector and the one or more trained model feature vectors, a distance metric is determined and compared with a threshold. If the distance metric exceeds the threshold, then a first message indicating that the plurality of image pairs fails to depict the particular user is generated. It is also determined whether at least one characteristic, of one or more characteristics determined for NIR images, changes from image-to-image by at least a second threshold. If so, then a second message is generated to indicate that the plurality of image pairs depicts the particular user of a mobile device. The second message may also indicate that an authentication of an owner to the mobile device was successful. Otherwise, a third message is generated to indi-
(Continued)

cate that a presentation attack on the mobile device is in progress.

20 Claims, 10 Drawing Sheets

Related U.S. Application Data continuation of application No. 15/340,926, filed on Nov. 1, 2016, now Pat. No. 10,176,377.

(60) Provisional application No. 62/249,798, filed on Nov. 2, 2015.

(51) Int. Cl.
| | |
|---|---|
| *G06T 5/00* | (2006.01) |
| *G06K 9/62* | (2022.01) |
| *H04N 9/04* | (2006.01) |
| *H04N 5/33* | (2006.01) |

(52) U.S. Cl.
CPC ............... *G06T 5/00* (2013.01); *H04N 5/04* (2013.01); *H04N 5/332* (2013.01); *H04N 9/04515* (2018.08)

(56) References Cited

U.S. PATENT DOCUMENTS

| | | | |
|---|---|---|---|
| 9,613,281 | B2 | 4/2017 | Hanna et al. |
| 9,792,499 | B2 | 10/2017 | Hanna et al. |
| 2005/0207614 | A1 | 9/2005 | Schonberg |
| 2007/0071290 | A1* | 3/2007 | Shah ................ G06K 9/00288 382/118 |
| 2007/0110285 | A1 | 5/2007 | Hanna et al. |
| 2009/0175509 | A1 | 7/2009 | Gonion et al. |
| 2010/0202669 | A1 | 8/2010 | Hollingsworth et al. |
| 2010/0208951 | A1 | 8/2010 | Williams et al. |
| 2010/0299530 | A1* | 11/2010 | Bell ........................ G06F 21/32 713/186 |
| 2011/0007949 | A1* | 1/2011 | Hanna ................ G06K 9/00248 382/107 |
| 2011/0123071 | A1 | 5/2011 | Shah et al. |
| 2013/0278631 | A1* | 10/2013 | Border .................. G02C 5/143 345/633 |
| 2016/0019420 | A1 | 1/2016 | Feng et al. |
| 2016/0019421 | A1 | 1/2016 | Feng et al. |
| 2016/0086304 | A1 | 3/2016 | Hsieh et al. |
| 2016/0171198 | A1 | 6/2016 | Archibald et al. |
| 2016/0335774 | A1 | 11/2016 | Hsieh et al. |
| 2017/0091550 | A1* | 3/2017 | Feng ........................ G06T 7/38 |
| 2017/0124383 | A1* | 5/2017 | Oh ..................... G06K 9/00268 |
| 2017/0199996 | A1 | 7/2017 | Han et al. |
| 2017/0255814 | A1 | 9/2017 | Kaehler |
| 2018/0018501 | A1 | 1/2018 | Mather et al. |
| 2018/0052514 | A1 | 2/2018 | Liu |
| 2019/0130166 | A1* | 5/2019 | Wang ................. G06K 9/00604 |

OTHER PUBLICATIONS

N. L. Clarke and S. M. Furnell. Authentication of users on mobile telephones—A survey of attitudes and practices. Computers and Security, 24(7):519-527, 2005.

P. Corcoran. Biometrics and Consumer Electronics: A Brave New World or the Road to Dystopia? IEEE Consumer Electronics Magazine, 2(2):22-33, Apr. 2013.

S. Curtis. Quarter of the world will be using smartphones in 2016. The Telegraph, Dec. 11, 2014.

S. Curtis. Smartphone at 20: IBM Simon to iPhone 6. The Telegraph, Aug. 16, 2014.

A. Czajka Pupil dynamics for iris liveness detection. IEEE Transactions on Information Forensics and Security, 10(4):726-735, Apr. 2015.

J. Daugman. How Iris Recognition Works. IEEE Transactions on Circuits and Systems for Video Technology, 14(1):21-30, Jan. 2004.

D Endres and J. Schindelin. A new metric for probability distributions. IEEE Transactions on Information Theory, 49(7):1858-1860, Jul. 2003.

D. A. Forsyth and J. Ponce. Computer Vision: A Modem Approach. Prentice Hall Professional Technical Reference, 2002.

J. Matey, O. Naroditsky, K. Hanna, R. Kolczynski, D. Lolacono, S. Mangru, M. Tinker, T. Zappia, and W. Zhao. Iris on the Move: Acquisition of Images for Iris Recognition in Less Constrained Environments. Proceedings of the IEEE, 94, 2006.

K. Park, H.-A. Park, B. Kang, E. Lee, and D. Jeong. A study on iris localization and recognition on mobile phones. EURASIP Journal on Advances in Signal Processing, 2008(1):281943, 2008.

Pew Research Center. The Smartphone Difference.

K. Raja, R. Raghavendra, and C. Busch. Video presentation attack detection in visible spectrum iris recognition using magnified phase information. IEEE Transactions on Information Forensics and Security, 10(10):2048-2056, Oct. 2015.

D. Siewiorek. Generation smartphone. IEEE Spectrum, 49(9):54-58, Sep. 2012.

S. Thavalengal, I. Andorko, A. Drimbarean, P. Bigioi, and P. Corcoran. Proof-of-concept and evaluation of a dual function visible/nir camera for iris authentication in smartphones. IEEE Transactions on Consumer Electronics, 61(2): 137-143, May 2015.

S. Thavalengal, P. Bigioi, and P. Corcoran. Iris authentication in handheld devices—considerations for constraint-free acquisition. IEEE Transactions on Consumer Electronics, 61(2):245-253, May 2015.

B. Toth. Liveness detection: Iris. Encyclopedia of Biometrics, pp. 931-938, 2009.

\* cited by examiner

IRIS LIVENESS DETECTION FOR MOBILE DEVICES

BENEFIT CLAIM

This application is a continuation of U.S. application Ser. No. 16/240,120 filed Jan. 4, 2019, which is a continuation of U.S. application Ser. No. 15/340,926, filed Nov. 1, 2016, issued on Jan. 8, 2019 as U.S. Pat. No. 10,176,377 which claims the benefit under 35 U.S.C. § 119 of U.S. provisional application 62/249,798, filed Nov. 2, 2015, the entire contents of which are hereby incorporated by reference for all purposes as fully set forth herein.

FIELD

Embodiments described herein relate generally to an iris liveness detection, and more specifically, to techniques for capturing and using information about the iris liveness to authenticate a user to a mobile device.

BACKGROUND

Since the introduction of a first smartphone in 1994, there has been a rapid growth in smartphones' technology. Smartphones have become much more than just computers; they also provide functionalities of personal databases, jukeboxes, cameras, communications hubs and communications gateways.

As today's smartphones are increasingly used to store and communicate sensitive financial and personal information, a reliable assessment of an identity of the smartphone's user is emerging as an important new service. Personal identification numbers or passwords appear to be insufficient for this purpose.

DETAILED DESCRIPTION

Figure 1:
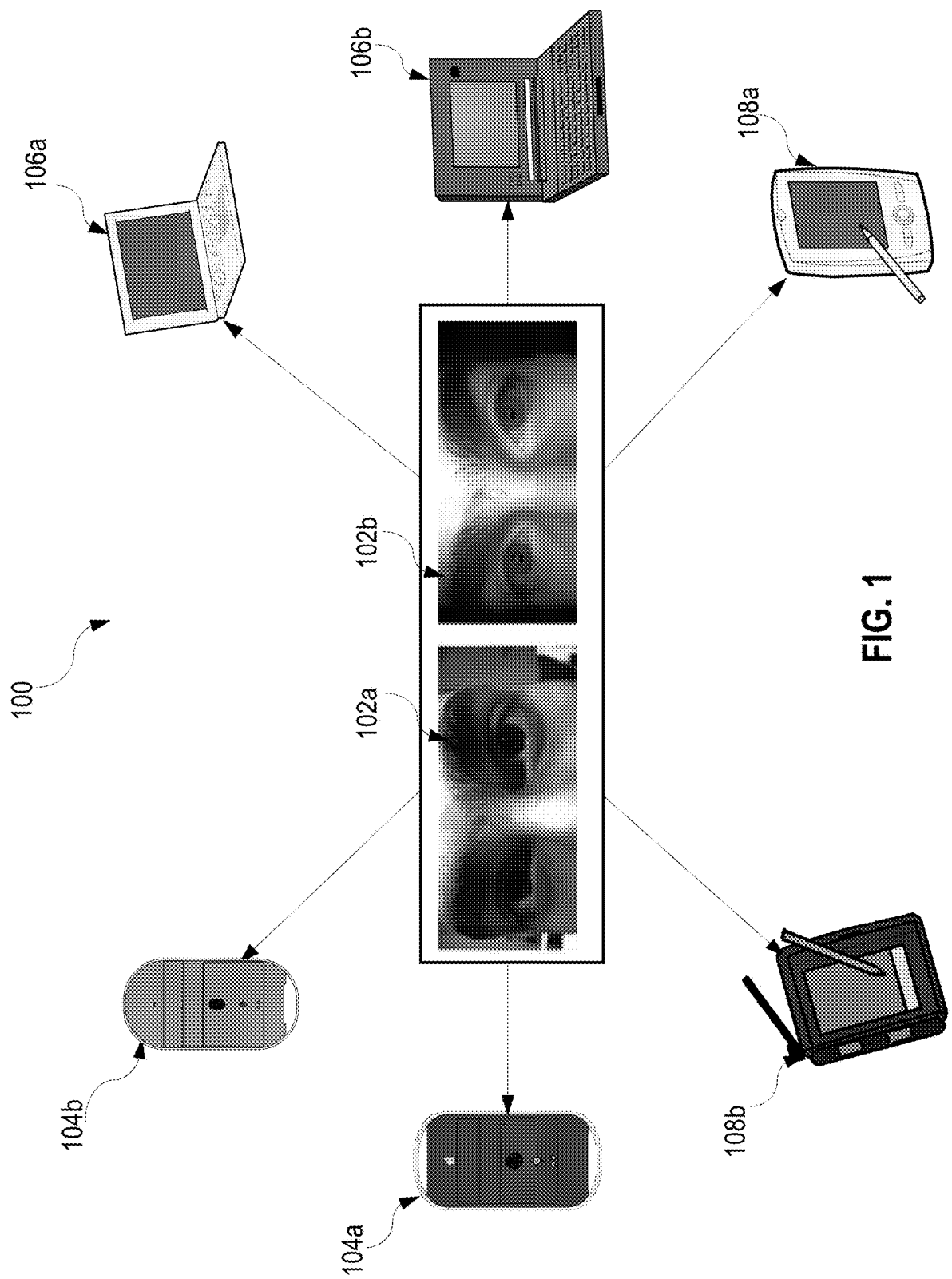
FIG. 1 is an example mobile device environment for implementing an iris liveness detection according to an example embodiment.

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

Introduction

Techniques are described herein for detecting liveness of a human iris using a mobile device. In an embodiment, the techniques include a workflow for acquiring iris biometric information of a person attempting to use a mobile device. The iris biometric information may be acquired using electronic sensors integrated with the device. The sensors may be configured to capture images of an eye or an eye's iris region. Examples of mobile devices may include smartphones, tablets, PDAs, laptops, electronic watches, and the like.

Electronic sensors may be configured to capture image pairs. An image pair includes a visible red-green-blue (RGB) spectrum image and a near infra-red (NIR) spectrum image of an eye or an eye's iris region. Capturing of the RGB and NIR images may be performed synchronously in terms of timing.

An RGB/NIR hybrid sensor is an example of a sensor configured to capture RGB/NIR image pairs synchronously. The RGB/NIR hybrid sensor is an electronic sensor configured to capture both an RGB image and an NIR image of the same scene and at the same time. The captured RGB/NIR image pair include the images that depict objects shown in the same spatial relationships to each other in each of the images. Therefore, the images of the RGB/NIR pair depicting for example, and eye, will depict the eye at the same location in each of the two images of the pair.

RGB and NIR images may be collectively referred to as incoming images. An incoming image may capture multi-spectral information specific to characteristics of a human eye and/or the eye' iris region. The multi-spectral information may be mapped onto one or more discrete feature vectors representing the characteristics of the eye's iris region.

Discrete feature vectors may be processed by applying one or more classifiers to the vectors to generate a classified image. A classifier is a means for analyzing contents of an image and contents of feature vectors generated for the image. Examples of classifiers may include intermediate classifiers which use a distance metric to determine whether the discrete feature vectors match predetermined training feature vectors. For example, if a distance value computed based on a discrete feature vector of an image depicting a person attempting to use a mobile device and a training feature of an image depicting an actual owner of the mobile device exceed a certain threshold, then it may be concluded that the person attempting to use the device is not the device's owner.

Classified images of an eye and/or an iris region may be further processed using multi-frame pupil localization techniques. Pupil localization techniques may include processing of pupil regions identified in the classified images and determining one or more characteristics of the pupil. The characteristics of the pupil may be used to determine liveness of the depicted iris. For example, the characteristics may be used to determine whether the images depict an iris of an owner of a mobile device or an iris of an imposter attempting to use the mobile device.

In an embodiment, the techniques described herein allow detecting spoofing attacks and security breaches committed with respect to mobile devices. The techniques are applicable to implementations involving actual human faces as well as 3-D face models made of materials that have properties similar to properties of human faces.

Overview

In an embodiment, a method comprises acquiring a plurality of image pairs using one or more image sensors. The sensors may be integrated with a mobile device, and the image pairs may depict a person who attempts to use the mobile device. Each image pair, of the plurality of image pairs, may include an RGB image and a NIR image, both images acquired in a synchronized manner. Acquiring a pair of images in the synchronized manner may include acquiring the images of the pair at a same time. The sensors may include at least one hybrid RGB/NIR sensor.

A particular image pair that depicts an eye-iris region in-focus is selected from a plurality of image pairs. Based on, at least in part, the particular image pair, a hyperspectral image is generated. The hyperspectral image may be generated by fusing two images included in the particular image pair.

Based on, at least in part, a hyperspectral image, a particular feature vector for the eye-iris region depicted in the particular image pair is generated. The particular feature vector may numerically represent a particular feature, such as an iris region depicted in the image pair.

One or more trained model feature vectors are retrieved from a storage unit. The trained model feature vectors may be generated based on images depicting an owner of a mobile device. The images depicting the particular user depict valid biometric characteristics of the owner of the device. The trained model features vectors are used to determine whether the particular feature vector have some similarities with the particular feature vector generated from image pairs depicting a person attempting to use the mobile device. The similarities may be quantified using a distance metric computed based on the particular feature vector and the one or more trained model feature vectors.

A distance metric represents a similarity measure between the trained model feature vectors and a particular feature vector. Stating differently, a distance metric represents a similarity measure of the particular image pair, acquired from a person attempting to use a mobile device, and the trained model feature vectors generated based on the valid biometric characteristics of an owner of the mobile device.

A distance metric may be compared with a predefined first threshold. The first threshold may be determined empirically. If the distance metric exceeds the first threshold, then a first message indicating that the plurality of image pairs fails to depict the particular user of a mobile device is generated. The first message may also indicate that the person whose depictions were acquired by the sensors of the mobile device is not the owner of the mobile device. Furthermore, the first message may indicate that a presentation attack on the mobile device is in progress.

However, if the distance metric does not exceed the first threshold, then two or more image pairs that depict an iris are selected from the acquired plurality of image pairs. For each NIR image of each image pair, of the two or more image pairs, one or more characteristics of the iris depicted in the image pair are determined.

It is also determined whether at least one characteristic, of the one or more characteristics determined for NIR images, changes from image-to-image by at least a second threshold. If so, then a second message indicating that the plurality of image pairs depicts the particular user of a mobile device is generated. The second message may also indicate that the person whose depictions were acquired by the sensors of the mobile device is the owner of the mobile device. Furthermore, the second message may indicate that an authentication of the owner to the mobile device was successful. Otherwise, a third message may be generated to indicate that a presentation attack on the mobile device is in progress.

Supervised and Unsupervised Authentications

Biometric information has been traditionally used by law enforcement to secure and restrict access to resources and facilities, and to establish identities of individuals. Biometric technology has been employed at for example, airports, train-stations, and other public areas. In these situations, biometric information is acquired in so called supervised settings. In a supervised setting, one individual oversees an acquisition of biometric information from another individual to ensure validity of the acquired information. Because the acquisition of the biometric information in these settings is supervised, spoofing of the biometric information of the individual is rather rare.

However, when biometric technology is adapted in unsupervised settings, spoofing of biometric information of an individual is not uncommon. For example, when biometric information is used to authenticate an individual to a consumer device such as a mobile device, a biometric data acquisition process is usually unsupervised. Thus acquiring biometric information of an individual in an unsupervised setting may be prone to spoofing. For instance, a fingerprint authentication, which has been widely adopted in mobile devices, may be easily targeted by various spoofing techniques.

Arguably, a human supervision may be an effective way for detecting spoofing attacks and widely used in many applications including border security patrol. However, the supervision is impractical in cases of mobile devices and other consumer electronic devices.

Iris Biometrics

An iris of an eye is an annular region between a pupil and a sclera of the eye. An iris region usually has a distinct pattern, and due to its distinctiveness, the pattern may be used to uniquely identify a person. Typically, an iris pattern contains complex and distinctive ligaments, furrows, ridges, rings, coronas, freckles and collarets. An iris pattern becomes relatively stable at the eight month of gestation, and remains stable throughout the person's lifetime.

Iris patterns usually demonstrate high variability. For example, even twin children may have different iris patterns. In fact, an iris pattern of the left eye of a person is most likely different than an iris pattern of the right eye of the same person. The unique characteristics of an iris region make the iris a suitable source of biometric information useful to authenticate individuals.

In an embodiment, biometric characteristics of an iris are collected and analyzed using mobile devices such as smartphones, tablets, PDAs, laptops, watches, and the like. The process of collecting and analyzing the biometric characteristics may be implemented to authenticate a user to a mobile device, to detect spoofing attempts, and/or to detect liveness of the iris in general.

Unsupervised Authentication to Mobile Devices

Authentication of a person to a mobile device based on the person's iris biometrics is usually unsupervised. It is unsupervised because it does not require any monitoring of the person authenticating himself to the device. Indeed, usually only the person who authenticates himself to the device participates in the authentication process.

Unsupervised authentication approaches based on biometric data are more susceptible to spoofing than traditional authentication techniques. This is because in the unsupervised authentication no one is monitoring a user as the user's biometric data is acquired. Since there is no monitoring, an imposter may attempt to provide intercepted or false information to gain access to a mobile device of another person.

Spoofing attacks on an unsupervised authentication system may include presenting to a mobile device biometric data of a person other than a user of the device, and mimicking real biometric information of the user of the device to gain access to the user's device. The mimicking may include providing to the device an iris biometric sample that was recorded without co-operation or knowledge of the user. This may include presenting, by an imposter, a picture, a recorded video, or a high quality iris image of the user in front of the device to gain access the user's device. These types of attacks are collectively referred to as presentation attacks.

Iris Liveness Detection Approach

An iris liveness detection approach presented herein is an anti-spoofing technique. The iris liveness detection allows determining whether biometric information presented to a device is an actual biometric measurement obtained from a live person and whether it was captured at the time when the biometric information is presented to the device.

An automatic liveness detection approach may include an analysis of intrinsic properties of a live person, an analysis of involuntary body signals, and a challenge-response analysis. In the context of an iris liveness detection, the analysis of intrinsic properties may include analyzing spectrographic properties of a human eye, analyzing a red-eye effect, and analyzing a 3-D curvature of an iris surface. An analysis of involuntary body signals may include analyzing an eyelid movements and hippus. A challenge-response analysis may include analyzing a user's response when the user is prompted to blink or look at different directions.

In an embodiment, an automatic iris liveness detection approach is implemented as part of an iris recognition system, and is used as a countermeasure against spoofing. It may be implemented in hardware, software, or both. It is applicable to a variety of electronic devices and its implementation may be optimized to minimally affect performance of the iris recognition system built into the devices.

Iris Liveness Detection Implemented in Mobile Devices

Iris liveness detection techniques may be implemented in mobile devices. The techniques allow recognizing static images such as high quality printed images of an iris, iris images projected on a screen, or high resolution video frames, and determining whether such images are presentation attacks on mobile devices. The techniques may be implemented in a variety of mobile devices without requiring any special hardware. Therefore, the techniques may be inexpensive solutions against presentation attacks. Furthermore, the techniques may not depend on user interactions, and thus they may be widely adopted for every day-use by consumers. Moreover, iris liveness detection techniques may be cost-effective yet powerful mechanisms incorporated into mobile devices. Implementations of the techniques may be computationally light, and may be embedded in a camera pipeline of the mobile device on in digital signal processors dedicated to an iris recognition.

In an embodiment, an iris liveness detection technique includes acquiring and processing visible spectrum RGB images as well as NIR images by a mobile device. The images may be captured using cameras or sensors integrated in the device. If a mobile device is equipped with cameras, then at least one camera may be a hybrid front facing camera configured to perform an iris recognition, and at least one camera may be configured to carry out video calls or selfie imaging. If a mobile device is equipped with RGB/NIR hybrid sensors, then the sensors may be configured to synchronously capture RGB/NIR image pairs.

Captured RGB/NIR image pairs may be processed using components of a mobile device configured to perform a visible spectrum iris recognition and an NIR iris recognition.

FIG. 1 is an example mobile device environment for implementing an iris liveness detection according to an example embodiment. A mobile device environment 100 may include various mobile devices. Non-limiting examples of mobile devices include various types and models of smartphones 104a-104b, laptops 106a-106b, PDAs 108a, and tablets 108b. Each mobile device may be configured to capture visual spectrum RGB images 102a and NIR images 102b of a person facing the device. For the clarity of the description, the examples described in the following section refer to the approaches implemented in smartphone 104a; however, the approaches may be implemented on any type of mobile device.

In an embodiment, visual spectrum RGB images 102a and NIR images 102b of a person facing smartphone 104a are captured by cameras and/or sensors integrated in smartphone 104a. The RGB images 102a and NIR images 102b may be further processed by components of smartphone 104a. The processing may include determining liveness of an iris depicted in the captured images. If the iris liveness is detected in the images, then the person facing smartphone 104a may be granted access to smartphone 104a and resources of smartphone 104a. However, if the iris liveness is not detected in the images, then the person facing smartphone 104a is denied access to the smartphone 104a and its resources.

Processing of RGB and NIR images by a mobile device may include determining locations of an iris in the images, determining locations of a pupil within the iris in the respective images, and analyzing the determined locations for the purpose of detecting the iris' liveness. Detecting the iris' liveness may allow identifying incidents of presentation attacks on the mobile device. For example, the technique may allow identifying presentation attacks when mannequins, having engineered artificial eyes used to duplicate the optical behavior of human eyes, are used to gain access to mobile devices.

Iris Liveness Detection Process

In an embodiment, an iris liveness detection process is part of an authentication process performed to authenticate a user to a mobile device. The iris liveness detection process may comprise two stages. The first stage of the process may include acquiring a plurality of RGB and NIR image pairs depicting the user facing the mobile device, and selecting a particular RGB/NIR image pair that depicts the user's eyes in-focus. The second stage of the process may include processing the particular image pair to detect liveness of the iris depicted in the image pair, and determining whether the user may access the mobile device and its resources.

Acquiring RGB and NIR Image Pairs

Figure 2:
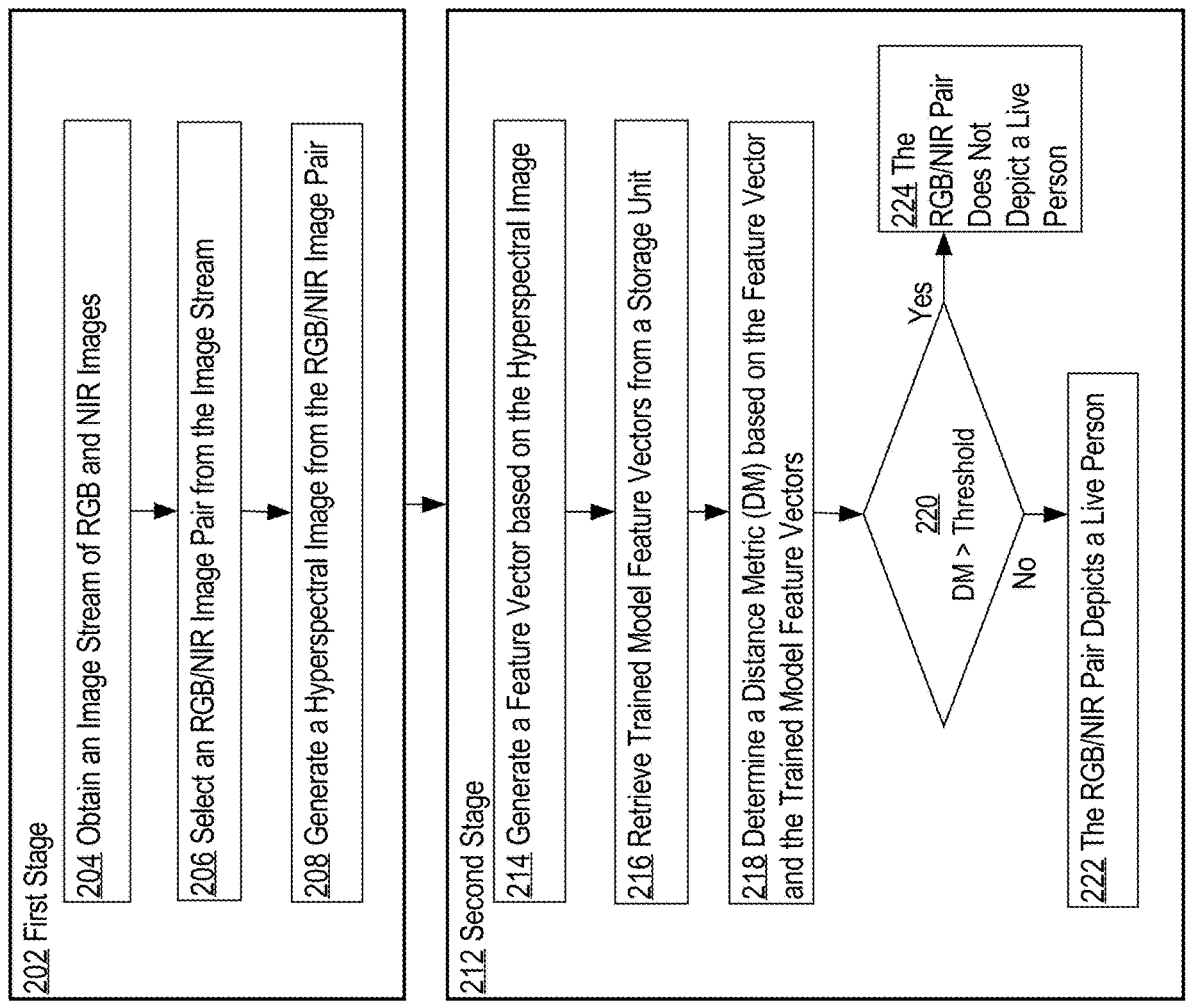
FIG. 2 is a flow diagram depicting an example iris liveness detection process according to an example embodiment.

FIG. 2 is a flow diagram depicting an example iris liveness detection process according to an example embodiment. The example iris liveness detection process comprises a first stage 202 and a second stage 212.

In step 204 of stage 202, an image stream is acquired by a mobile device. The image stream may include RGB and NIR image pairs and depict a user facing a mobile device. The pairs may be acquired using one or more camera and/or one or more sensors integrated in the mobile device. The cameras and the sensors may be separate devices, hybrid devices, or both, and may be configured to capture and acquire the images in a synchronized manner.

Capturing images in a synchronized manner may include synchronizing the capturing in terms of timing. For example, a hybrid RGB/NIR sensor may be used to capture both an RGB image and a NIR image at the same time. Synchronizing the capturing of both images allows capturing the images in such a way that the images depict objects shown in the same spatial relationships to each other in each of the images.

Capturing of the images may be initiated by a user as the user tries to use a mobile device. For example, the user may press a certain key, or touch a certain icon displayed on the device to "wake up" the device. A mobile device may be equipped with a "wake up" key, or a "unlock" key, used to request access to the mobile device and to initiate the image acquisition process. Selection of the keys configured to initiate the image acquisition and a naming convention for the keys depends on the specific implementation and the type of the mobile device.

In an embodiment, a user facing a mobile device presses a "wake up" key of the mobile device to initiate an image acquisition process. Upon detecting that the key was pressed, the mobile device initiates an RGB/NIR hybrid sensor, or cameras and sensors, integrated in the device, causes the hybrid sensor to synchronously acquire RGB and NIR images of eyes of the user. The RGB/NIR image pairs are acquired synchronously to ensure that the locations of certain features in one image correspond to the location of the certain features in another image.

RGB and NIR image pairs may be acquired in a normal office situation with active illumination of 1350 nm. Examples for the image pairs acquired at different stand-off distance are shown in FIG. 3.

Figure 3:
FIG. 3 depicts examples of RGB/NIR image pairs acquired according to an example embodiment.

FIG. 3 depicts examples of RGB/NIR image pairs acquired according to an example embodiment. The examples depicted in FIG. 3 include an RGB image 302a, an NIR image 302b, an RGB image 304a, and an NIR image 304b. Images 302a-302b depict one person and images 304a-304b depict another person. The RGB/NIR image pairs may be synchronously acquired by an RGB/NIR hybrid sensor at the time when a user is trying to authenticate himself to a mobile device. The image pairs may be compared to training RGB/NIR images acquired from an owner of the device.

In step 206, an obtained image stream of RGB/NIR image pairs is processed to select an RGB/NIR image pair that depicts an eye-iris region in-focus. This may include applying detectors configured to detect eye-iris regions in the image pairs and select a subset of the image pairs that depict the eye-iris regions, and comparators configured to select, from the subset, an RGB/NIR image pair that depicts the eye-iris region in focus. If the eyes are detected in one image pair, the eyes' locations in the subsequently captured image pairs may be tracked until one or more image pairs depicting the eyes in-focus are found. For example, the visible spectrum (wavelength) of the image stream may be subjected to a certain type of processing to determine images that depict a sequence of good quality, in-focus eye regions. The processing may be performed using the state-of-the art face detectors, eye location detectors, and eye trackers.

Generating a Hyperspectral Image From RGB/NIR Image Pairs

In step 208, based on an RGB-NIR image pair depicting an eye-region in-focus, a hyperspectral image is generated. A hyperspectral image is generated from an RGB image and a NIR image of the image pair by fusing both images into one image. Fusing of an RGB image and a NIR image may be accomplished by applying a fusing operator to a mathematical representation of the RGB image and a mathematical representation of the NIR image.

In an embodiment, a mathematical representation $I_v$ of an RGB image and a mathematical representation $I_i$ of a NIR image of an RGB/NIR image pair are obtained and used to generate a hyperspectral image $I_h$. The mathematical representations of the RGB image and the NIR image capture ambient light and a surface reflectance on an eye represented at four different wavebands (Blue, Green, Red and NIR), respectively. The hyperspectral image $I_h$, obtained by fusing the mathematical representations of the RGB and NIR images, will capture an ambient light and a surface reflectance on an eye represented at the four different wavebands and derived by applying a fusing operator to the respective mathematical representations.

In an embodiment, mathematical representations of an RGB image and an NIR image of an image pair are generated. The RGB and NIR image formation by an RGB/NIR hybrid sensor may be captured using the following expression:

$$I_v = \int_{\lambda_v} \int_p E(p, \lambda_v) R(p) Q(\lambda_v) dp d\lambda_v \quad (1)$$

$$I_i = \int_{\lambda_i} \int_p E(p, \lambda_i) R(p) Q(\lambda_i) dp d\lambda_i \quad (2)$$

where $I_v \in \mathbb{R}^{m \times n}$ is the RGB image, $I_i \in \mathbb{R}^{k \times l}$ is the NIR image, $\lambda_v \in [350 \text{ nm}, 700 \text{ nm}]$, $\lambda_i \in [750 \text{ nm}, 900 \text{ nm}]$ are the wavelength ranges of the RGB and NIR images, respectively;

where p is the spatial domain of the sensor;

where R is the spatial response of the sensor, where E is the irradiance; and where Q is the quantum efficiency of the sensor.

In an embodiment, $$I_i \in \mathbb{R}^{k \times l}$$

is demosaiced/interpolated to obtain m=k, n=l. That means that $I_i$ (the mathematical representation of the NIR image) is demosaiced/interpolated so that the mathematical representation of the NIR image has the same size m×n as the mathematical representation of the RGB image.

The two images, $I_v$ and $I_i$ are fused together to generate a hyperspectral image $I_h$ using the following expression:

$$I_h = \Gamma(I_v, I_i) \quad (3)$$

where $$I_h \in \mathbb{R}^{m \times n \times 4},$$

and $\Gamma$ is a fusing operator.

In an embodiment, a hyperspectral image $I_h$ is further processed to minimize the effect of ambient light. This may be accomplished by obtaining metadata from a camera or a sensor, and using the metadata to perform a white color balance, a gamma correction, and/or an auto exposure correction of the hyperspectral image $I_h$.

Generating Feature Vectors from a Hyperspectral Image

In an embodiment, an iris liveness detection process includes a second stage. In the second stage, a hyperspectral image $I_h$ is processed to identify one or more multispectral features depicted in the hyperspectral image. Since the hyperspectral image $I_h$ represents an ambient light and a surface reflectance on an eye represented at four different wavebands (Blue, Green, Red and NIR), image data in each of the wavebands of the hyperspectral image $I_h$ may be processed individually to extract the features from each waveband separately.

Extracting features from a hyperspectral image may include clustering image data of the hyperspectral image based on the intensity values within each of the wavebands and determining the features based on the clustered image data. Extracted features may be represented as features vectors.

A feature vector generated for an image is a vector that contains information describing one or more characteristics of an object depicted in the image. An example feature vector may include a numerical value representing characteristics of an eye region depicted in the image. The numerical value may be computed based on raw intensity values of the pixels that constitute the eye region.

Referring again to FIG. 2, in step 214 of second stage 212, one or more feature vectors are generated based on a hyperspectral image obtained in first stage 202.

In an embodiment, a hyperspectral image $I_h$ is viewed as comprising four image planes ($I_{c1}$, $I_{c2}$, $I_{c3}$, $I_{c4}$) having the size m×n and representing four different wavebands. The planes may also be referred to as channels. The pixels in each plane are clustered separately to form $\alpha$ predefined clusters. The clustering process may be represented using the following expression:

$$I_{cj}^u = \Omega(I_{cj}), \quad (4)$$

where $I_{cj}^u \in [1, \alpha]^{m \times n}$ represents a label of the cluster corresponding to the pixels in $I_{cj}$, $j \in [1, 4]$ denotes the image channel (waveband), $\alpha$ is a count of the clusters, and $\Omega$ is the clustering operator. While the count $\alpha$ of clusters may be chosen in any manner, in an embodiment, based on the dimensionality and computational complexity of expression (4), $\alpha$=8 is chosen.

In an embodiment, a clustering operator $\Omega$ is a nearest neighborhood clustering operator configured to group the pixels in each plane into one of the $\alpha$ cluster at the time and based on the intensity values of the pixels in the plane.

In an embodiment, the label clusters are concatenated to obtain:

$$I_h^u = \Gamma'(I_{c1}^u, I_{c2}^u, I_{c3}^u, I_{c4}^u), \quad (5)$$

where $\Gamma'$ is a concatenation operator.

Due to different combinations of clustering obtained by the concatenation of the label clusters for four channels, each element in $I_h^u$ may have one of the $s=\alpha^4$ unique combinations. The normalized frequency distribution of each combination may be calculated using a transform operator H:

$$H: \to I_h^u = F, \quad (6)$$

where $F=(f_1, f_2, \ldots, f_s)$ is the number of times each unique cluster combination appeared in $I_h^u$. The mapping defined using expression (6) may be used as feature vectors determined for the hyperspectral image $I_v$.

The feature extraction technique presented herein represents a unique distribution of information across various image planes in a hyperspectral image $I_v$. Furthermore, the presented technique is computationally inexpensive and generates relatively compact feature vectors.

Obtaining Trained Model Feature Vectors

In step 216 of stage 212, one or more trained model feature vectors are obtained or retrieved. The trained model feature vectors may be generated based on actual and reliable images of a "live" user of a mobile device, and stored in storage units of the device.

Trained model feature vectors for a live user may be calculated when the user's mobile device is configured to implement an iris liveness detection approach. The vectors may be generated based on one or more images depicting for example, facial features of the user, and may be used to train an image classifier to predict whether other images most likely depict the user of the mobile device or whether the other images are presentation attacks on the device.

Determining a Distance Metric

In step 218, a distance metric (DM) is computed based on a feature vector, generated from a hyperspectral image, and one or more trained model feature vectors retrieved from a storage unit. A storage unit may be a volatile memory unit of a mobile device, a non-volatile memory unit of the mobile device, or any other unit configured to store data.

A distance metric is a numerical representation of similarities between a feature vector generated from a hyperspectral image and trained model feature vectors generated from images of a user of a mobile device. If a distance value computed from the feature vector and the trained model feature vector exceeds a certain threshold, then the feature represented by the feature vector is dissimilar to the feature represented by the trained model feature vector. This may indicate that an individual whose depictions were used to generate the hyperspectral image is an imposter, and not the user of the mobile device.

However, if the distance value does not exceed the certain threshold, then the feature represented by the feature vector is similar, or maybe even identical, to the feature represented by the trained model feature vector. This may indicate that the individual whose depictions were used to generate the hyperspectral image is the user of the mobile device.

In an embodiment, a distance metric is computed as a deviation (error) d. The deviation d may be computed using a Bayesian approach. Assume that $F^q$ denotes a feature vector of a query image, such as a hyperspectral image generated from an RGB-NIR image pair acquired by an RGB-NIR hybrid sensor. Furthermore, assume that $F^{db}$ denotes one or more trained model feature vectors of a trained model. The trained model may be trained on actual images of a user of a mobile device. In a Bayesian approach, a deviation d is measured as the square root of the entropy approximation to the logarithm of evidence ratio when testing whether the query image can be represented as the same underlying distribution of the live images. This can be mathematically represented as:

$$d^{q,db} = \sqrt{D\left(F^q \| \frac{1}{2}(F^q + F^{db})\right) + D\left(F^{db} \| \frac{1}{2}(F^q + F^{db})\right)} \quad (7)$$

$$d^{q,db} = \sqrt{\sum_{z=1}^{s}\left(f_Z^q \log \frac{2f_z^q}{f_z^q + f_z^{db}} + f_z^{db} \log \frac{2f_z^{db}}{f_z^q + f_z^{db}}\right)} \quad (8)$$

where, $D(F^q \| F^{db})$ is the Kullback-Leibler divergence of $F^{db}$ obtained from $F^q$, which is a measure of information lost when the database feature vector $F^{db}$ is approximated from the query feature vector $F^q$. The above presented choice of distance metric $d^{q,db}$ is based on the observations that it is a close relative to Jenson-Shannon divergence and an asymptotic approximation of $\lambda^2$ distance. Furthermore, $d^{q,db}$ is symmetric and fulfills the triangle inequality.

Detecting Iris Liveness Based on a Distance Metric

In step 220 of stage 212, a distance metric $d^{q,db}$ computed using expressions (7)-(8) is used to determine whether an incoming query image depicts a live person. If $d^{q,db} < \beta$, where $\beta \in \tilde{}$ is a predetermined certain threshold, then, in step 222, it is determined that the query image depicts a live person. Otherwise, in step 224, it is determined that the query image does not depict a live person.

Presentation Attacks

Presentation attacks may include various types of spoofing attacks on a mobile device. They may include mimicking real biometric information of a user of a mobile device to gain access to the user's device. The mimicking may include for example, providing to the device an iris biometric sample that was recorded without knowledge of the user of the device. One of the most common presentation attacks include presenting a high quality printed photograph in front of the device. For example, an imposter may try to use the high quality color photograph of the user of the mobile device to try to access the device.

Effectiveness of approaches for detecting presentation attacks may be measured using various approaches. One approach includes determining a Normal Presentation Classification Error Rate (NPCER). The NPCER is defined as the proportion of live users incorrectly classified as a presentation attack. Another approach includes determining an "Attack Presentation Classification Error Rate" (APCER). The APCER is defined as the proportion of presentation attack attempts incorrectly classified as live users. Yet other approach includes determining an "Average Classification Error Rate" (ACER), which is computed as the mean value of the NPCER and the APCER error rates.

The ability to detect presentation attacks depends on a variety of factors. For example, detecting the presentation attacks may depend on the surface reflection and refraction of the material that is presented in front of a hybrid sensor of a mobile device. There are many differences between reflection and refraction factors determined for a printed image and reflection and refraction factors determined for a human skin.

In an embodiment, an iris liveness detection process detects presentation attacks conducted using photographs shown on either reflective paper or a matte paper, and presentation attacks conducted by projecting images on a screen or a display device. The approach takes advantage of the fact that the photographic material (reflective paper or matte paper) and the displays of devices have properties that are significantly different than the properties of the human skin or the human eye.

Figure 4:
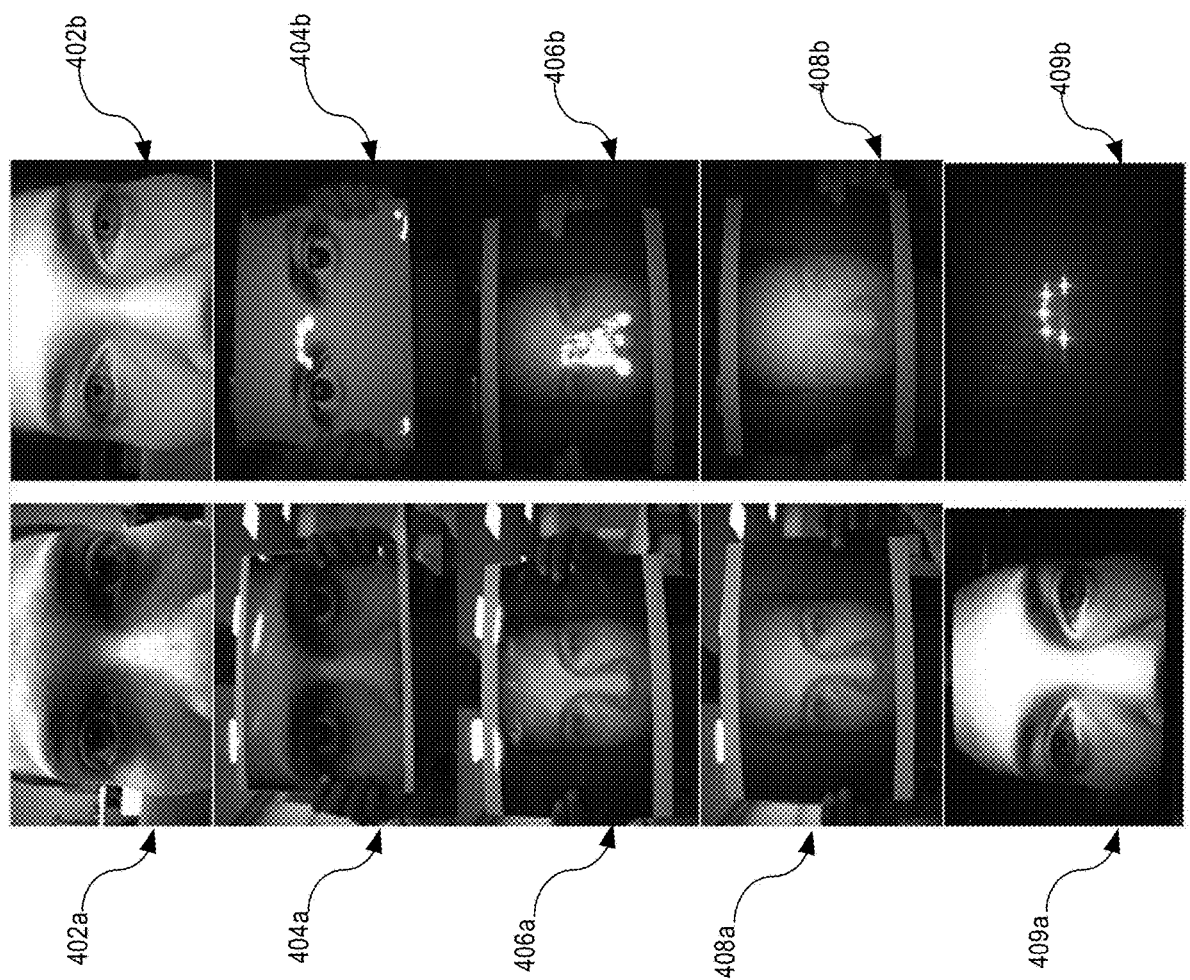
FIG. 4 depicts examples of RGB/NIR image pairs acquired from a live person and examples of RGB/NIR image pairs acquired from photographs and computer displays.

FIG. 4 depicts examples of RGB/NIR image pairs acquired from a live person and examples of RGB/NIR image pairs acquired from photographs and computer displays. Images 402a, 404a, 406a, 408a and 409a are visible spectrum RGB images. Images 402b, 404b, 406b, 408b and 409b are NIR images. Images 402a and 402b are images acquired from a live person; all remaining images depicted in FIG. 4 are examples of presentation attacks. Specifically, images 404a and 404b are high quality visible printed images. Images 406a and 406b are high quality glossy NIR printed images. Images 408a and 408b are NIR images printed on a matte paper. Images 409a and 409b are NIR images shown in a laptop screen having a high resolution display. Each of pairs 404-409 may be compared with image pair 402 to show the differences in surface reflections depicted in pairs 404-409 provided during presentation attacks and surface reflections depicted in pair 402 obtained from a live person.

Advanced Presentation Attacks

However, in some cases, relying on differences in the respective properties alone may be insufficient to differentiate presentation attacks from legitimate access attempts. As the spoofing techniques are evolving, presentation attacks may include techniques that go beyond using known printing materials and image displaying devices. New materials and display devices may be used to conduct presentation attacks in the future. For example, a new presentation attack may be conducted using a realistic 3-D face model of a user of a mobile device.

Figure 5:
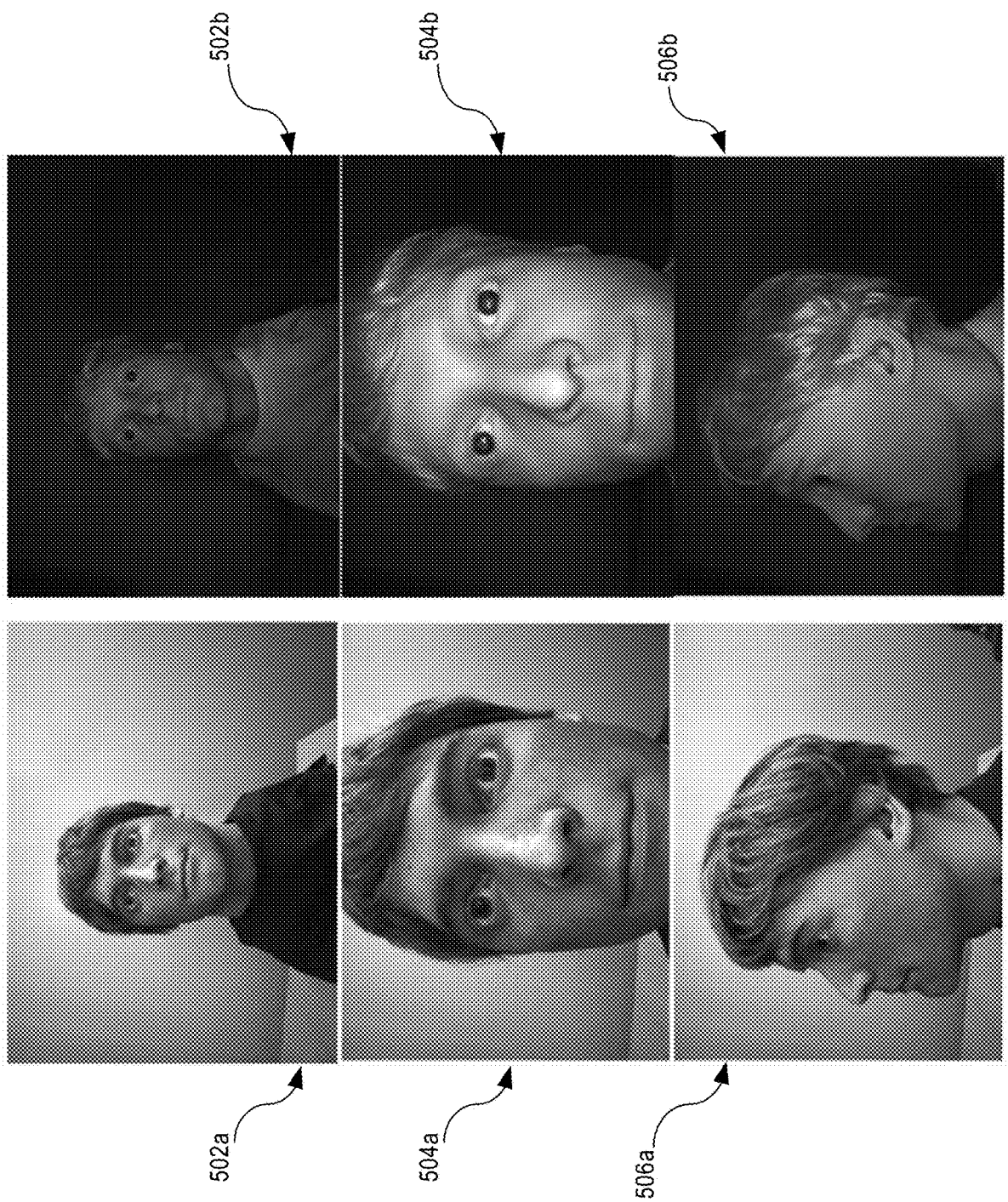
FIG. 5 depicts examples of RGB/NIR image pairs acquired from a 3-D model of a face.

FIG. 5 depicts examples of RGB/NIR image pairs acquired from a 3-D model of a face. A 3-D face model may be a mannequin that has engineered artificial eyes with iris regions to duplicate the optical behavior of human eyes, including a red-eye effect. The mannequin may be made out of a skin-like material that has properties similar to the properties of a human skin. The mannequin may also have realistically reproduced hair, eyebrows, lashes, and so forth.

In FIG. 5, images 502a, 504a, and 506a are visible spectrum RGB images, while images 502b, 504b, and 506b are NIR images. Images 502a and 502b in the first row in FIG. 5 depict a realistic 3-D face model. Images 504a and 504b in the second row in FIG. 5 depict close up images showing the human like skin, hair and ocular properties. Images 506a and 506b in the third row in FIG. 5 are side views of the mannequin.

It appears that reflectance and refraction properties in the images of a mannequin in FIG. 5 more-less correspond to reflectance and refraction properties of photographs of a live person, such as pair 402a-402b in FIG. 4. For example, it appears that the eye regions in images 504a and 504b capture a red-eye effect. Hence, the mannequin may easily be misclassified as a live person.

Furthermore, a mannequin may be equipped with printed contact lenses with an iris pattern of a live person. If an imposter uses images of such a mannequin to conduct a presentation attack on a mobile device, then there is a possibility that the imposter may obtain an access to the mobile device. Therefore, analyzing the spectral response of the presented images alone may be insufficient to identify sophisticated presentation attacks.

Pupil Detection and Analysis

In an embodiment, an iris liveness detection approach for mobile devices is enhanced using techniques for a pupil analysis performed on the acquired images. An analysis of a pupil of a human eye depicted in the images increases the chances that even sophisticated presentation attacks on a mobile device may be identified. This is because mimicking both the pupil dynamics and properties of the human eye region is unlikely feasible at the current state of image-based technologies.

Current smartphones have capabilities to acquire 120-240 frames per second, but that capability will most likely be doubled with the next-generation technology. For example, very soon it might be possible to acquire as many as 30-40 images within the time window that is now required to acquire only two images. If it is assumed that on average 30 frames are acquired within a particular time window, then about 60 images may be acquired within that time window in the future. The 60 images may include 30 RGB images and 30 NIR images acquired in a synchronous manner. Therefore, the advances in the smartphone technology may enable the smartphones to also perform a complex analysis of pupils depicted in the acquired images.

In an embodiment, a pupil detection and a pupil analysis are performed on a sequence of NIR images. Detecting a pupil in the NIR images may include cropping the images so that the images represent only the eye regions, and then processing the cropped images using an edge-localization approach and a gradient-based approach to determine a location of the pupil in the images.

One-Dimensional Image Processing for a Pupil Localization

Characteristics of an iris region of the eye depicted in digital images may be impacted by illumination variations and shadows created by eyelashes surrounding the eye. The issue, however, may be addressed by representing the images using a representation that is less sensitive to the illumination variations. An example of such a representation is a representation generated using one-dimensional image processing.

In an embodiment, characteristics of an iris region and a pupil in the iris region are captured using one-dimensional image processing. One-dimensional image processing usually requires no thresholding, and therefore allows reducing the effect of edge smearing.

One-dimensional processing of an image may include applying a smoothing operator along a first direction of the image, and applying a derivative operator along a second (the orthogonal) direction. Let $I \in \mathbb{R}^{-m \times n}$ be a cropped image depicting an eye region. Let the cropped eye image be an NIR image denoted as $I_i$. The smoothed eye image may be represented using the following expression:

$$I_\theta^s = I\left(x, \frac{r + x\sin(\theta)}{\cos(\theta)}\right) \otimes S_\theta(x), \quad (9)$$

where $I_\theta^s \in \mathbb{R}^{-m \times n}$ is the smoothed iris image, $S_\theta(x) \in \mathbb{R}^{-m \times 1}$, is the one dimensional smoothing function along a line which has a perpendicular distance of $r \in \bullet$ from the origin and makes an angle $\theta \in \bullet$ with the X-axis, and $\otimes$ is the one-dimensional convolution operator. The convolution operation may be carried out for each value of r to obtain the smoothed image $I_\theta^s$. The smoothing function used here may be defined using the following expression:

$$S_\theta(x) = \frac{1}{\sqrt{2\pi\sigma_s^2}} e^{\frac{-x^2 \sec^2(\theta)}{2\sigma_s^2}}. \quad (10)$$

where $\sigma_s \in \tilde{\phantom{x}}$ is the standard deviation of the Gaussian function used in the smoothing process. The one dimensional derivative operator along the orthogonal direction $\theta + 90°$ is applied to the smoothed image for different values of r to obtain an intermediate edge gradient image, expressed as:

$$I_\theta^g = I_\theta^s\left(x, \frac{r + x\sin(\theta + 90)}{\cos(\theta + 90)}\right) \otimes G_{\theta+90}(x), \quad (11)$$

where $$G_\theta(x) = \frac{x \sec^2(\theta)}{\sqrt{2\pi\sigma_g^6}} e^{\frac{-x^2 \sec^2(\theta)}{2\sigma_g^2}}. \quad (12)$$

where, $\sigma_g \in \tilde{\phantom{x}}$ is the standard deviation of the derivative operator. The magnitude representation of an edge gradient may be obtained using the following expression:

$$I_\theta^M = \sqrt{(I_\theta^g)^2 + (I_{\theta+90}^g)^2}. \quad (13)$$

In an embodiment, a transform operator T is applied on $I_\theta^M$, as shown below:

$$I_d = T_\theta I_\theta^M, \quad (14)$$

where $I_d$ is the transformed image. The transformation operator T is chosen in such a way that it expresses the image $I_\theta^M$ in a binary form, followed by the detection of the largest connected region in the image;

where $\delta \in \bullet$ is a threshold selected in such a way that $n_{min}^P \leq \delta \leq n_{max}^P$, where $n_{min}^P$ and $n_{max}^P$ are the minimum and maximum numbers of pixels which could possibly be in the pupil region in the particular frame. Based on metadata obtained from a face and eye tracking system and based on the camera parameters, an approximate number of pixels in the pupil region may be determined. The value of $\delta$ may be learned for each individual frame.

Figure 6:
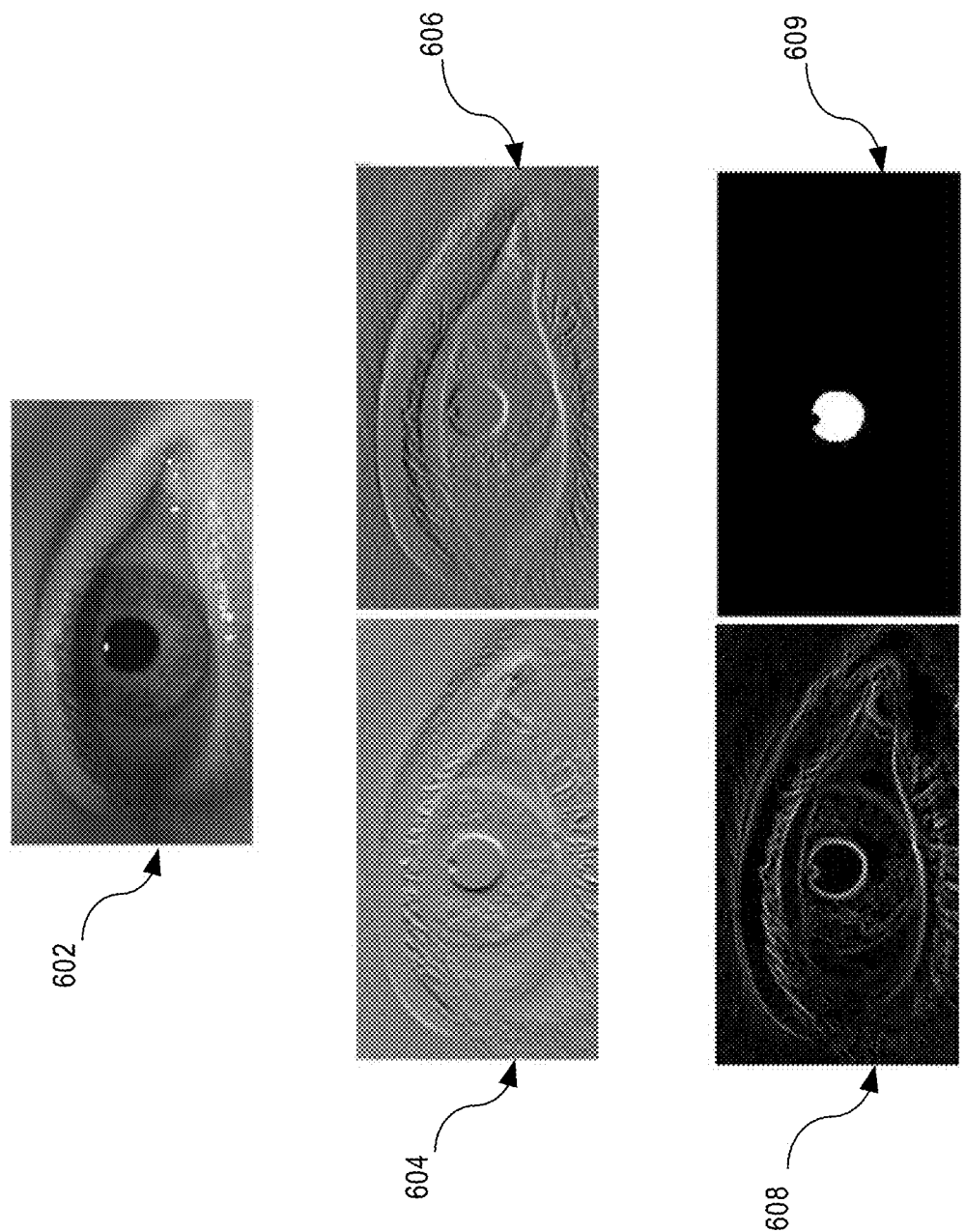
FIG. 6 depicts a pupil localization process according to an example embodiment.

FIG. 6 depicts a pupil localization process according to an example embodiment. In FIG. 6, image 602 depicts an original NIR image $I_i$. Image 604 is an edge gradient image generated along one direction of the original NIR image. Image 606 is an edge gradient image generated along an orthogonal direction. Image 608 is a magnitude image. Image 609 depicts the localized pupil.

Images 602-609 depicted in FIG. 6 may be obtained using expressions (9)-(14), and assuming that $\theta=90°$. Image 602 represents the original image. Images 604-606 represent the output of one-dimensional image processing for the angular direction $\theta$ and its orthogonal value. Image 608 is the magnitude image obtained from the result of the one dimensional image processing, and the localized pupil is shown in image 609.

Dynamic Characteristics of a Pupil

In an embodiment, after a pupil is localized in images depicting a human eye, the images are further processed to determine dynamic characteristics of the depicted pupil. Dynamic characteristics of a pupil may include the eye's saccades, hippus, and pupil dilation/constriction which may arise naturally as the person moves toward the camera. The dynamic characteristics may also include an eye-blinking, which alters the size of a pupil area. Examples of images that were captured as a person was blinking are depicted in FIG. 7.

Figure 7:
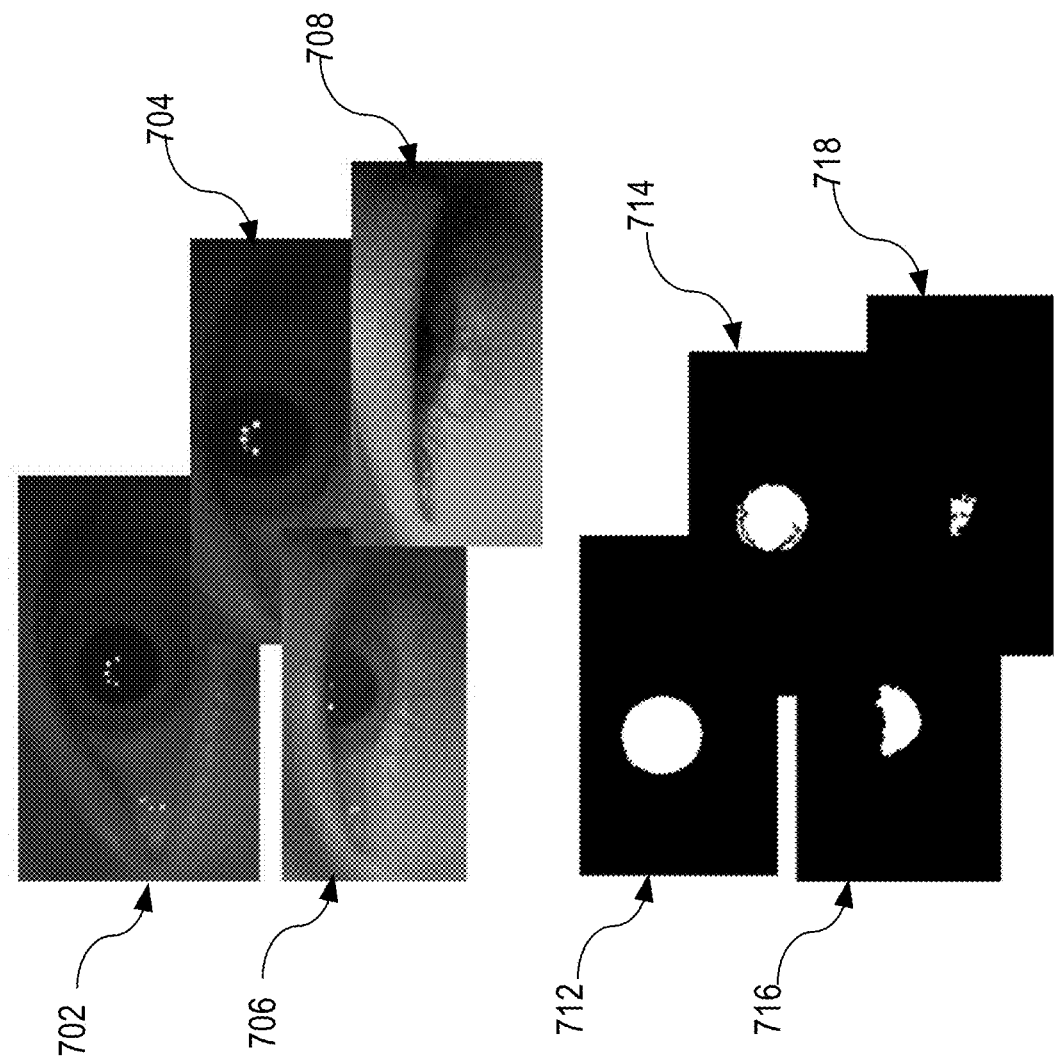
FIG. 7 depicts an example sequence of images showing an eye-blinking effect.

FIG. 7 depicts an example sequence of images showing an eye-blinking effect. Images 702, 704, 706 and 708 are NIR images depicting an eye of a live person and acquired as the person was blinking. Images 712, 714, 716 and 718 are black-and-white images depicting locations and sizes of the pupils identified in the images 702, 704, 706, and 708, respectively. Images 712, 714, 716 and 718 show that the sizes of the pupil and the pupil's locations were changing as the person was blinking. The changes appear to be significant in detecting the iris liveness, and may be measured with an acceptable accuracy using the presented pupil analysis technique.

Pupil Analysis

A pupil analysis may include an analysis of a pupil area in general, and an analysis of a pixel intensity in the pupil region in particular. For example, a pupil analysis performed on the images may involve determining whether a size of the pupil area depicted in the images is changing from image-to-image, or whether an eye-blinking is depicted in the images. If such changes are detected in the images, then it may be concluded that the images depict a live person. However, if such changes cannot be detected, then the images are most likely provided as a presentation attack. For example, the images may be images taken from a mannequin whose eyes have no dynamic characteristics, such as an eye-blinking.

In an embodiment, a pixel intensity in a pupil region of any of NIR images 712, 714, 716, and 718 of FIG. 7 is determined using a Purkinje image. A Purkinje image is an image formed by the light reflected from the four optical surfaces of the human eye. Purkinje images may be used in various applications, including an iris liveness detection, an eye tracking, and a red-eye effect detection.

Binary Decision Tree

In an embodiment, a binary decision tree is used to classify a sequence of images captured by a mobile device and depicting human eyes. The binary decision tree may be used to classify the images as either images of a live person or images presented as part of a presentation attack.

A binary decision tree may be designed to interface with different models and approaches, including an intermediate decision approach of FIG. 2 for an iris liveness detection, and a pupil analysis described in FIG. 6 and FIG. 7. The binary decision tree usually has one root node and one or more intermediate nodes. An example of the binary decision tree is depicted in FIG. 8.

Figure 8:
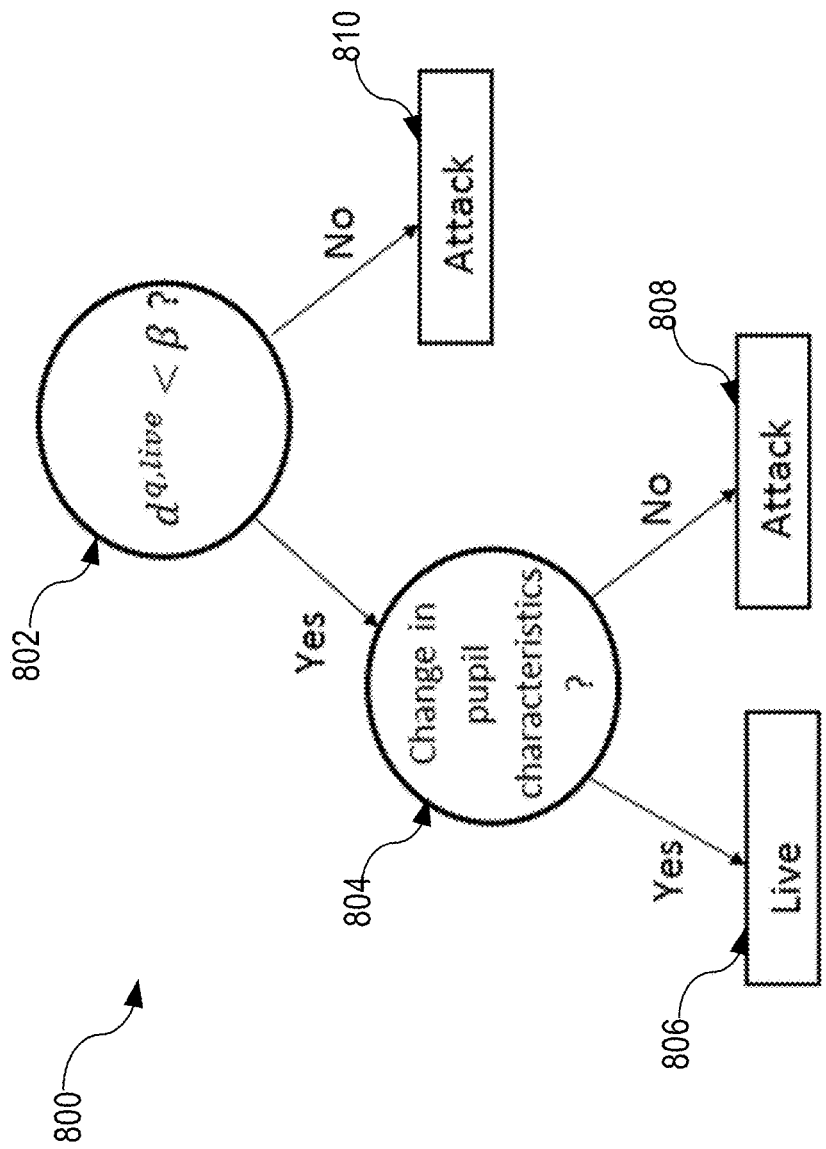
FIG. 8 is an example binary decision tree used to determine whether images depict a live person or are part of a presentation attack.

FIG. 8 is an example binary decision tree used to determine whether images depict a live person or are part of a presentation attack. An example binary decision tree 800 comprises a root node 802, an intermediary decision node 804, and result nodes 806, 808 and 810. Root node 802 is used to determine whether an incoming image depicts a live iris or a presentation attack image. This may be determined based on a distance metric $d^{q,db}$ computed using expressions (7)-(8) described above, and where q represents an incoming image (a query image) and db represents a feature vector $F^{db}$ described above.

In root node 802, a decision is made whether $d^{q,db} < \beta$, where $\beta \in \bullet$ and corresponds to a predetermined threshold value. If $d^{q,db} < \beta$, then it may be concluded that the incoming image depicts a live person, and further processing is performed at intermediary decision node 804. Otherwise, it may be concluded in result node 810 that the incoming image does not depict a live person, but is part of a presentation attack.

If it was determined that the incoming image is an image of a live person, then, in intermediary decision node 804, one or more image recognition modules are invoked to perform an iris recognition on the incoming image. A pupil localization result, derived as described in FIG. 6 and FIG. 7, may be provided to intermediate decision node 804 along with additional input images acquired along with the incoming image. The provided result and the images may be used by an iris recognition module to determine whether the images show any changes in characteristics of the depicted pupil.

If it was determined that the provided information indicates some changes in characteristics of the depicted pupil, then result node 806 is reached to indicate that the incoming image depicts a live person. However, if it is determined that the provided information does not indicate any changes in characteristics of the depicted pupil, then result node 808 is reached to indicate a presentation attack.

In an embodiment, a decision process depicted in FIG. 8 provides an effective approach for detecting presentation attacks. It combines the approaches for determining whether incoming images depict a live iris, and the approaches for determining whether the incoming images depict a live pupil. The performance of the system implementing the decision process depicted in FIG. 8 may be measured using the indicators such as ACER, NPCER and APCER, described above. A comparison of the results obtained when both the iris and the pupil analysis was performed with the results when only the iris analysis was performed indicates that the approaches implementing both the iris and the pupil analysis are more effective.

Iris and Pupil Liveness Detection Approach

Figure 9:
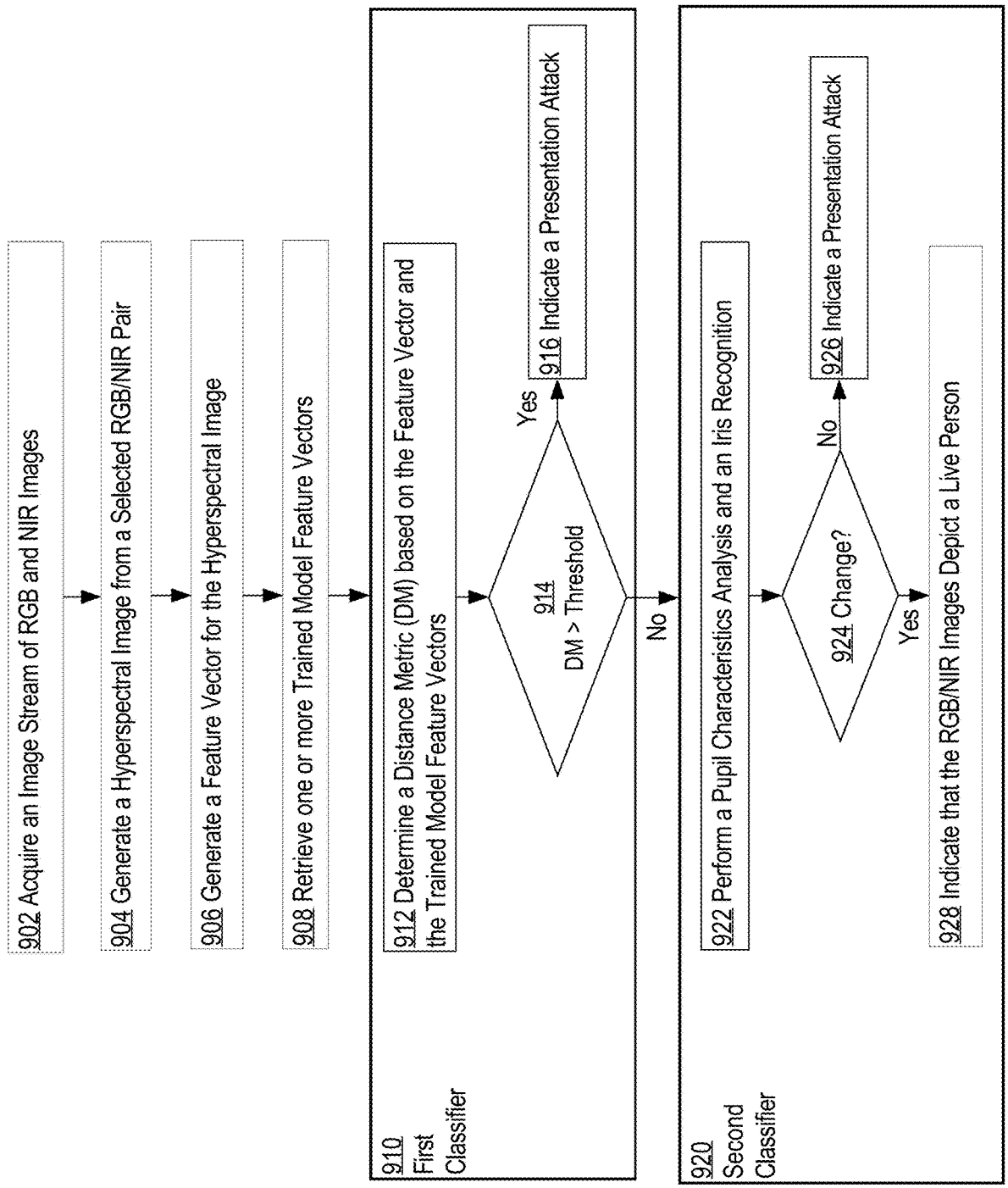
FIG. 9 is a flow diagram of an example process for detecting presentation attacks according to an example embodiment.

A decision process of FIG. 8 for detecting presentation attacks may also be represented using a flow diagram. FIG. 9 is a flow diagram of an example process for detecting presentation attacks according to an example embodiment. In step 902, an image stream of RGB and NIR image pairs is acquired using a mobile device. In an embodiment, this step corresponds to step 204 in FIG. 2.

An image stream may include a plurality of image pairs, and each image pair of the plurality of images may include an RGB image and NIR image, both acquired in a synchronized manner. The image pairs may be acquired using for example, an RGB/NIR hybrid sensor that synchronously captures both the RGB image and the NIR image.

In an embodiment, an acquired stream of images may be processed to identify at least one image pair that depicts an eye region in-focus. The identified image pairs may be further reviewed to determine one image pair that includes the images that provide the high quality depiction of the eye region.

In step 904, a hyperspectral image is generated from a selected RGB/NIR image pair. This step corresponds to step 208 of FIG. 2. A hyperspectral image is generated by fusing an RGB image with an NIR image of the RGB/NIR image pair using a fusing operator. A fusing operator may be expressed using for example, expression (3).

In step 906, a feature vector for a hyperspectral image is generated. This step corresponds to step 214 of FIG. 2. A feature vector generated for an image represents one or more characteristics of an object depicted in the image. An example of characteristics may be a depiction of eyes in the image. In this example, a feature vector may be generated for an eye region detected in the image.

In step 908, one or more trained model feature vectors are retrieved from a storage unit. This step corresponds to step 216 of FIG. 2. Trained model feature vectors are vectors that were generated based on actual and reliable images of a live user of a mobile device. The trained model feature vectors are used as references in determining whether a feature vector generated from a hyperspectral image in step 906 matches the trained model feature vectors within some threshold.

Once one or more trained model feature vectors are retrieved, a first classifier 910 is applied to the trained model feature vectors and a feature vector generated for a hyperspectral image. Applying first classifier 910 may include steps 912, 914 and 916.

A classifier is a means or an approach for classifying an image based on visual contents of the image. Applying a classifier to an image allows analyzing contents of the image and analyzing the numerical properties of the image. Image classification allows processing the image's contents to determine one or more image features and represent the image features as numerical properties.

In step 912, a distance metric (DM) is determined based on a feature vector generated from a hyperspectral image, and one or more trained model feature vectors retrieved from a storage unit. This step corresponds to step 218 in FIG. 2. The DM may be computed using for example, a Bayesian approach. The approach may utilize for example, expressions (7)-(8).

In step 914, a test is performed to determine whether a DM exceeds a predefined threshold. A threshold may be a numeric value determined empirically based on for example, some training or experience. If the DM exceeds the threshold, then step 916 is performed. Otherwise, step 922 is performed.

In step 916, an indication is generated to specify that an acquired stream of images does not depict a live person, and instead it is a presentation attack. The indication may include an error message, a text message, an email, an audio signal, or any other form of communications. This step is performed when it has been determined that a distance between a feature vector and one or more training model feature vectors exceeds a threshold, and therefore, there is no sufficient similarity between the RGB/NIR image pair and the actual/reliable images of the user of a mobile device. Because the RGB/NIR image pair is not sufficiently similar to the actual/reliable images of the user, it may be concluded that the RGB/NIR images do not depict the user of the mobile device, and instead they depict an imposter.

Steps 922, 924, 926 and 928 include an application of a second classifier 920 to NIR images of two or more RGB/NIR image pairs. Alternatively, this process may be performed on two or more image pairs.

In step 922, a pupil characteristics analysis and an iris recognition are performed on NIR images of RGB/NIR image pairs. This may be include cropping each of the NIR images so they depicts only eye regions. This may also include smoothing the cropped images using for example, a smoothing functions described in expression (10). Furthermore, this may include generating an intermediate edge gradient image from the smoothed image described in expression (11). The intermediate edge gradient image may be further transformed using a transformation operator T, as in expression (14). Once locations of a pupil in the images is determined, one or more characteristics of the pupil are determined.

In step 924, a test is performed based on the identified characteristics to determine whether there are any changes in the characteristics of the identified pupil from image-to-image. An analysis of characteristics of the identified pupil may include an analysis of a pixel intensity in the pupil region in two or more NIR images. For example, an analysis of pupil's characteristics may include determining whether a size of the pupil area, depicted in the images, is changing from image-to-image, or whether an eye-blinking is depicted in the images.

If such changes are detected in the images, then step 928 is performed, in which an indication is generated that the images depict a live person. However, if no change can be detected, then in step 926, an indication is generated that the images are most likely provided as a presentation attack. For example, the images may be images taken from a mannequin whose eyes have no dynamic characteristics, such as an eye-blinking. The indication may include an error message, a text message, an email, an audio signal, or any other form of communications.

In an embodiment, an iris liveness detection technique is presented for in iris recognition applications implemented in mobile devices. The technique employs the ability to acquire a plurality of RGB/NIR image pair by a mobile device in a synchronized manner. The technique also employs the ability to collect and process iris biometrics using the mobile device. The approach allows detecting whether acquired RGB/NIR image pairs depict a live person or whether the images are presented as a presentation attack. The approach may be utilized to authenticate a user to the mobile device by detecting whether the user is indeed an authorized owner of the mobile device.

The approach may be implemented on any type of mobile device. It does not require implementing or integrating any additional hardware. It may be implemented as an authentication mechanism to authenticate a user to a mobile device and to detect authentication spoofing attempts.

Extensions

The approach may be further developed to include the ability to utilize various types of iris biometrics information, not only biometrics of an iris or a pupil. For example, the approach may be extended to take into consideration biometrics of fingerprints, noses, eyebrows, and the like.

The approach may also be enhanced by developing and providing a database containing various types of biometrics data, and a database containing information about different types of advanced presentation attacks.

The approach may be implemented using the latest visible spectrum/NIR CMOS image sensor technologies.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
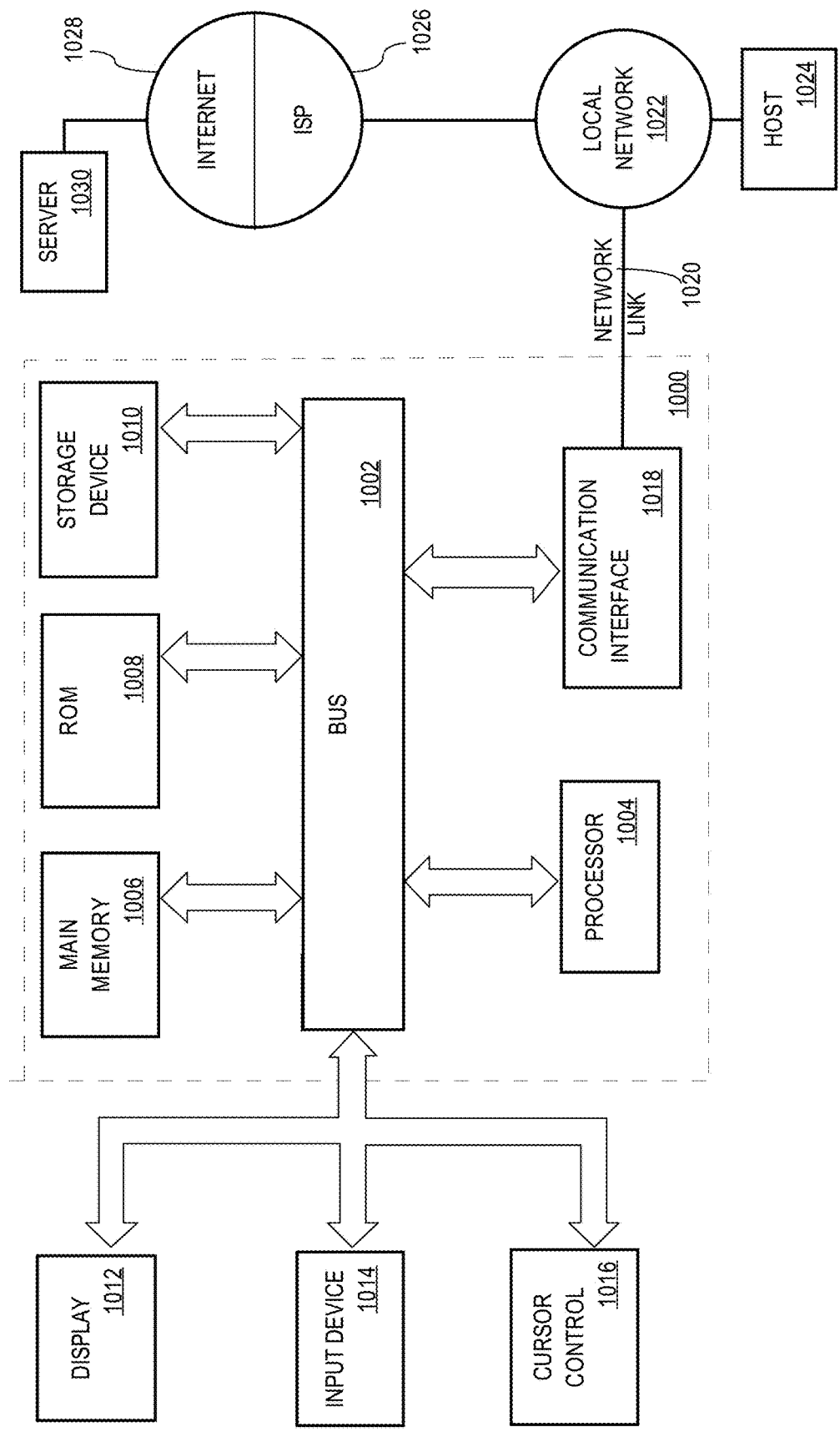
FIG. 10 illustrates a computer system upon which one or more embodiments may be implemented.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a plasma display and the like, for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. An electronic device comprising:
   a first image sensor;
   a second image sensor;
   one or more processors; and
   one or more computer-readable media storing instructions that, when executed by the one or more processors, cause the electronic device to perform operations comprising:
   generating, at a first time and using the first image sensor, first image data representing an eye;
   determining, based at least in part on the first image data, a first characteristic associated with the eye;
   generating, at a second time and using the first image sensor, second image data representing the eye;
   determining, based at least in part on the second image data, a second characteristic associated with the eye;
   determining that the eye is associated with a user based at least in part on the first characteristic and the second characteristic; and
   generating, using the second image sensor, third image data representing the eye.

2. The electronic device as recited in claim 1, the operations further comprising identifying the user based at least in part on the third image data.

3. The electronic device as recited in claim 1, wherein:
   the first image sensor is a first type of image sensor; and
   the second image sensor is a second type of image sensor that is different than the first type of image sensor.

4. The electronic device as recited in claim 1, wherein:
   the first image data represents a first near infra-red image depicting the eye;
   the second image data represents a second near infra-red image depicting the eye; and
   the third image data represents a red-green-blue image depicting the eye.

5. The electronic device as recited in claim 1, the operations further comprising:
   determining a change between the first characteristic and the second characteristic,
   and wherein determining that the eye is associated with the user is based at least in part on the change.

6. The electronic device as recited in claim 1, the operations further comprising:
   determining a change between the first characteristic and the second characteristic; and
   determining that the change is equal to or greater than a threshold change,
   and wherein determining that the eye is associated with the user is based at least in part on the change being equal to or greater than the threshold change.

7. The electronic device as recited in claim 1, the operations further comprising:
   determining, based at least in part on the first image data, a third characteristic associated with the eye; and
   determining, based at least in part on the second image data, a fourth characteristic associated with the eye,
   and wherein determining that the eye is associated with the user is further based at least in part on the third characteristic and the fourth characteristic.

8. The electronic device as recited in claim 1, wherein:
   the first characteristic includes a first size of a pupil area of the eye; and
   the second characteristic includes a second size of the pupil area of the eye.

9. The electronic device as recited in claim 1, the operations further comprising:
   generating, at a third time and using the first image sensor, fourth image data representing an additional eye;
   determining, based at least in part on the fourth image data, a third characteristic associated with the additional eye;
   generating, at a fourth time and using the first image sensor, fifth image data representing the additional eye;
   determining, based at least in part on the fifth image data, a fourth characteristic associated with the additional eye; and identifying a spoofing attack based at least in part on the fourth image data and the fifth image data.

10. A method comprising:
generating, at a first time and using a first image sensor, first image data representing an eye;
generating, at a second time and using the first image sensor, second image data representing the eye;
determining that the eye is associated with a user based at least in part on the first image data and the second image data;
generating, using a second image sensor, third image data representing the eye; and
identifying the user based at least in part on the third image data.

11. The method as recited in claim 10, wherein:
the first image sensor is a first type of image sensor; and
the second image sensor is a second type of image sensor that is different than the first type of image sensor.

12. The method as recited in claim 10, wherein:
the first image data represents a first near infra-red image depicting the eye;
the second image data represents a second near infra-red image depicting the eye; and
the third image data represents a red-green-blue image depicting the eye.

13. The method as recited in claim 10, further comprising:
determining, based at least in part on the first image data, a first characteristic associated with the eye; and
determining, based at least in part on the second image data, a second characteristic associated with the eye,
and wherein determining that the eye is associated with the user is based at least in part on the first characteristic and the second characteristic.

14. The method as recited in claim 13, further comprising:
determining a change between the first characteristic and the second characteristic,
wherein determining that the eye is associated with the user is based at least in part on the change.

15. The method as recited in claim 13, further comprising:
determining a change between the first characteristic and the second characteristic; and
determining that the change is equal to or greater than a threshold change,
wherein determining that the eye is associated with the user is based at least in part on the change being equal to or greater than the threshold change.

16. The method as recited in claim 13, wherein:
the first characteristic includes a first size of a pupil area of the eye; and
the second characteristic includes a second size of the pupil area of the eye.

17. The method as recited in claim 10, further comprising:
generating, at a third time and using the first image sensor, fourth image data representing an additional eye;
generating, at a fourth time and using the first image sensor, fifth image data representing the additional eye; and
identifying a spoofing attack based at least in part on the fourth image data and the fifth image data.

18. An electronic device comprising:
a first image sensor;
a second image sensor;
one or more processors; and
one or more computer-readable media storing instructions that, when executed by the one or more processors, cause the one or more processors to perform operations comprising:
generating, at a first time and using the first image sensor, first image data representing an eye;
determining, based at least in part on the first image data, a first characteristic associated with the eye;
generating, at a second time and using the first image sensor, second image data representing the eye;
determining, based at least in part on the second image data, a second characteristic associated with the eye; and
determining that the eye is not associated with a user based at least in part on the first characteristic and the second characteristic.

19. The electronic device as recited in claim 18, wherein:
the first image sensor is a first type of image sensor; and
the second image sensor is a second type of image sensor that is different than the first type of image sensor.

20. The electronic device as recited in claim 18, the operations further comprising:
determining a change between the first characteristic and the second characteristic; and
determining that the change is less than a threshold change,
wherein determining that the eye is not associated with the user is based at least in part on the change being less than the threshold change.

* * * * *